United States Patent Office 3,743,645
Patented July 3, 1973

3,743,645
1-SUBSTITUTED-4-PHENOXYPIPERIDINES
Grover Cleveland Helsley, Richmond, Va., assignor to A. H. Robins Company, Incorporated, Richmond, Va.
No Drawing. Application Nov. 7, 1970, Ser. No. 874,987, which is a continuation-in-part of abandoned application Ser. No. 786,392, Dec. 23, 1968. Divided and this application Oct. 19, 1970, Ser. No. 82,116
Int. Cl. C07d 29/24
U.S. Cl. 260—293.74          9 Claims

ABSTRACT OF THE DISCLOSURE 1-substituted-4-phenoxypiperidines useful as tranquilizers are disclosed. The compounds are prepared by reacting 4-phenoxypiperidine intermediates which are prepared from 4-piperidinol with compounds containing active halides.

---

The present invention relates to certain novel heterocyclic compounds and more particularly to 1-substituted-4-phenoxypiperidines, compositions thereof, and methods of making and using same.

This is a division of copending application Ser. No. 874,987 filed Nov. 7, 1970, now U.S. Pat. No. 3,542,794, which is a continuation-in-part application of application Ser. No. 786,392, filed Dec. 23, 1968, and now abandoned.

The invention is especially concerned with novel piperidine compounds having the formula:

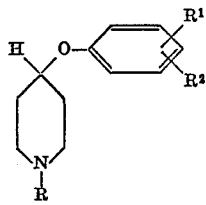

Formula I wherein;

R is monosubstituted benzoylalkyl, monosubstituted phenoxyalkyl, disubstituted phenoxyalkyl, ethoxycarbonyl and 2,3-di-hydroxypropyl,
$R^1$ is hydrogen, lower alkyl, lower alkoxy, trifluoromethyl and halogen of atomic weight less than 80,
$R^2$ is hydrogen and acetyl, and
pharmaceutically acceptable acid addition salts thereof.

The compounds of the invention are useful because of their pharmacological action on the central nervous system. The activity is demonstrable when the compounds are used in the form of the free base or in the form of their non-toxic acid addition salt. The preferred form of the compounds containing basic groups is as their non-toxic acid addition salts for increased water solubility and ease of administration.

The compounds of Formula I can be classed as major tranquilizers. In particular, the compounds of Examples 4–6, 1 - [3 - (4 - fluorobenzoyl)propyl]-4-(2-methoxyphenoxy)piperidine, 4 - (4 - acetyl - 2-methoxyphenoxy)- 1 - [3 - (4 - fluorobenzoyl)propyl]piperidine, and 4-(4-acetyl - 2 - methoxyphenoxy )- 1 - [3-(4-fluorophenoxy)-propyl]piperidine demonstrate major tranqualizing activity best using the recognized test method of J. P. De Vanzo et al., Psychopharmacologia 9, 210 (1966). The preferred compounds are effective in blocking aggressive behavior in fighting mice when administered at a dose level of 5 to 20 mg./kg. intraperitoneally.

It is, therefore, an object of the present invention to provide certain novel and useful 1-substituted-4-phenoxypiperidines, compositions thereof, and methods of making and using the same. Another object is to provide novel 1-substituted-4-phenoxypiperidines which are useful as tranquilizers. Other objects of the invention will be apparent to one skilled in the art and still other objects will become apparent hereinafter.

In the foregoing Formula I and where they appear elsewhere throughout this specification, the terms have the following significance.

The term "lower alkyl" as used herein includes straight and branched radicals of up to eight carbon atoms inclusive and is exemplified by such groups as methyl, ethyl, propyl, isopropyl, butyl, tertiary butyl, amyl, hexyl, isoamyl, heptyl, octyl and the like. The term "lower alkoxy" has the formula —O—lower alkyl.

This invention also includes acid addition salts of the bases of Formula I with organic and inorganic acids. Such salts are easily prepared by methods known in the art. When the compounds are to be used as intermediates for preparing other compounds or for any non-pharmaceutical use, the toxicity or non-toxicity of the salt is immaterial; when the compounds are to be used as pharmaceuticals, they are most conveniently used in the form of pharmaceutically acceptable non-toxic acid addition salts. Both toxic and non-toxic salts are therefore within the purview of the invention. The acids which can be used to prepare the preferred pharmaceutically acceptable non-toxic acid addition salts are those which produce, when combined with the free bases, salts whose anions are relatively innocuous in therapeutic doses of the salts, so that beneficial physiological properties inherent in the free bases are not vitiated by side effects ascribable to the anions. Exemplary of organic salts are those formed with citric, acetic, lactic, maleic, fumaric, benzoic, tartaric, ascorbic, pamoic, succinic, methane-sulfonic, malic, citraconic, itaconic acid and the like. Exemplary of inorganic salts are those formed with hydrochloric, hydrobromic, sulfuric, phosphoric and nitric acids.

The following Chart I illustrates the process of the invention and shows the various procedures involved both in preparing the starting materials and the final product of the invention.

CHART I

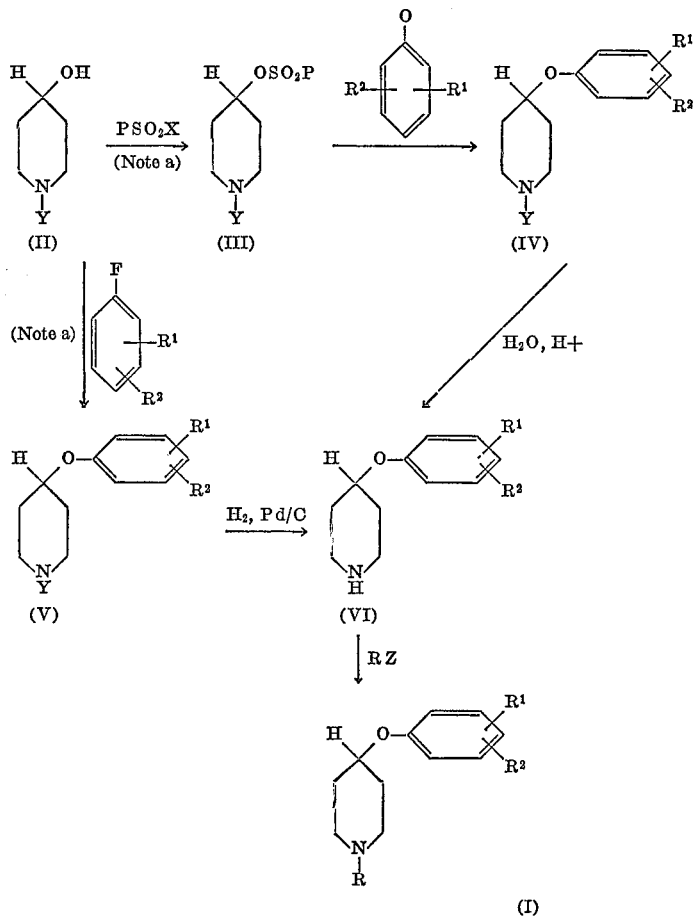

(R, R¹ and R² have values previously assigned.)
(X is halogen, preferably chlorine.)
(P is an alkyl or aryl group.)
(Y is acetyl or benzyl.)

NOTE: (a) Use of sodium salt of II prepared with sodium hydride improves yield in this step.

The starting materials for the process of the present invention are the appropriately substituted - 3 - phenoxy-pyrrolidines represented in Chart I by Formula V. These materials (VI) may in turn be obtained from a 1-substituted-4-piperidinol shown as Formula II.

As illustrated in Chart I, the 3-phenoxypyrrolidines may be prepared by reaction sequence (a) II→III→IV→VI or by reaction sequence (b) II→V→VI. In (a) a 1-acetyl-4-piperidinol is converted to a 1-substituted - 4 - alkylsulfonyloxy- or 4-aryl-sulfonyloxy-piperidine by reaction with an agent such as an alkyl- or an aryl-sulfonyl halide, allowing the thus-formed 4-sulfonyloxy-piperidine to react with a phenol to produce a compound of Formula IV, and hydrolyzing IV in an acidic medium to produce a compound of Formula VI, the starting material of the present invention. In (b) a 1 - benzyl - 4 - piperidinol is reacted with a fluorobenzene compound to give a compound of Formula V which is subjected to hydrogenolysis to produce a compound of Formula VI, the starting material of the present invention.

As a general procedure for preparing the starting materials (VI) by reaction sequence (a), a 1-acetyl-4-piperidinol is converted to 1 - acetyl - 4 - arylsulfonyloxy-piperidines by methods known to the art. The thus-formed 1 - acetyl - 4 - arylsulfonyloxypiperidines are reacted with the sodium salt of a substituted phenol in a solvent such as dimethyl-sulfoxide, absolute ethanol or dimethyl formamide. The reaction is preferably run at a temperature of from about 40° C. to about 60° C. and for a period of from about eight to about 16 hours. The 1 - acetyl-4-phenoxypiperidines (IV) are hydrolyzed in an aqueous acidic medium using mineral acids as, for example, hydrochloric acid, for a period of from about twelve to about eighteen hours, preferably at reflux temperature to give the starting materials of the present invention.

As a general procedure for preparing the starting materials (VI) by reaction sequence (b), a 1-benzyl-4-piperidinol is reacted with a fluorobenzene, displacing the fluoride radical to give 1-benzyl-4-phenoxypiperidines (V) which are shaken in an atmosphere of hydrogen in the presence of a noble metal catalyst supported on carbon, preferably palladium-on-charcoal, to give compounds of Formula VI, the starting materials of the present invention.

As shown in Chart I, the general procedure for the preparation of compounds of the present invention involves the reaction of 4-phenoxypiperidines (VI) with reactants RZ to give the novel 1-substituted-4-phenoxy-piperidines I. The term RZ represents compounds having reactive halides such as benzoylalkylhalides and phenoxy-alkylhalides.

A suitable procedure for carrying out the process of the invention is as follows.

A 4 - phenoxypiperidine and a reactive halide compound are contacted in an inert organic solvent as, for example, benzene, toluene, 1-butanol, chloroform, and the like. Generally, but not necessarily, an acid binder such as a metal carbonate is used to bind the liberated hydrogen halide. The reaction is carried out at a temperature from at or below room temperature to the reflux temperature and for a period of from about four to about forty-eight hours. The maximum temperatures and reaction times are generally necessary for halides that are not readily displaced. When the halide compound is a benzoylalkylhalide, the compound is preferably used as its ketal to give maximum yield. The product 1-substituted-4-phenoxypiperidine is isolated by washing the reaction mixture with water and evaporation of the organic solvent. The residual product is purified by procedures such as chromatography on magnesium silicate, distillation and crystallization from a suitable solvent.

The following preparations are given by way of illustration only and are not to be construed as limiting.

PREPARATION 1

4-(2-methoxyphenoxy)piperidine

A stirred suspension of 55.7 g. (1.03 mole) of sodium methoxide in 800 ml. of absolute ethanol was treated with a solution of 127.9 g. (1.03 mole) of guaiacol in 100 ml. of absolute ethanol and the mixture was added over a period of one hour to a solution of 300 g. (1.03 mole) of 1 - acetyl - 4 - hydroxypiperidine tosylate in 100 ml. of absolute ethanol. The stirred mixture was heated 18 hours, cooled, filtered and the solvent evaporated at reduced pressure. The crude oil was dissolved in 650 ml. of ethanol, 450 ml. of concentrated hydrochloric acid was added, the mixture was refluxed eight hours, cooled and extracted with benzene. The aqueous acidic layer was separated, basified with dilute aqueous sodium hydroxide and the base insoluble oil extracted with benzene. The combined benzene extracts were dried over magnesium sulfate, the solvent evaporated and the residual oil distilled at reduced pressure. The fraction boiling at 109–111° C./ .07 mm. was collected and weighed 22.0 g. (10% yield).

*Analysis.*—Calcd. for $C_{12}H_{17}NO_2$ (percent): C, 69.53; H, 8.27; N, 6.76. Found (percent): C, 69.32; H, 8.18; N, 6.81.

PREPARATION 2

4-(3-trifluoromethylphenoxy)piperidine hydrochloride

A solution of 200 g. of 1 - acetyl - 4 - (3-trifluoromethylphenoxy)piperidine, 800 ml. of 6 N hydrochloric acid and 300 ml. of ethanol was refluxed 12 hours, cooled and extracted with ether. The aqueous acidic layer was neutralized with 50% sodium hydroxide solution and the oil which separated was extracted with benzene. The combined benzene extracts were washed with water, dried over magnesium sulfate and the solvent evaporated. The residual oil was distilled at reduced pressure and the fraction boiling at 70–74° C./.05 mm. was collected and weighed 30 g. (29% yield). The hydrochloride was prepared and it melted at 196–198° C. after crystallization from isopropanol.

*Analysis.*—Calcd. for $C_{12}H_{15}NOF_3Cl$ (percent): C, 51.16; H, 5.37; N, 4.97. Found (percent): C, 51.31; H, 5.45; N, 5.09.

Using the procedures of Preparations 1 and 2, the following compounds are prepared using the stated starting materials.

4-(4-methoxyphenoxy)piperidine is prepared by reacting the tosylate ester of 1-acetyl-4-hydroxypiperidine with 4-methoxyphenyl followed by acid hydrolysis of the 1-acetyl group;

4-(3,5-di-methylphenoxy)piperidine is prepared by reacting the tosylate ester of 1-acetyl-4-hydroxypiperidine with 3,5-dimethylphenol followed by acid hydrolysis of the 1-acetyl group;

4-(4-chlorophenoxy)piperidine is prepared by reacting the tosylate ester of 1-acetyl-4-hydroxypiperidine with 4-chlorophenol followed by acid hydrolysis of the 1-acetyl group.

PREPARATION 3

4-(4-acetyl-2-methoxyphenoxy)piperidine hydrochloride

A solution (25° C.) containing 0.30 mole of sodium ethoxide, 700 ml. of absolute ethanol, and 49.9 g. (0.30 mole) of acetovanilline, was treated with 175 ml. dimethylformamide and 89.1 g. (0.30 mole) of 1-acetyl-4-piperidinol tosylate in 100 ml. of ethanol and the mixture refluxed 12 hours, cooled and filtered. The solvents were evaporated at reduced pressure and the residue was treated with 250 ml. of 6 N hydrochloric acid and 100 ml. of ethanol. The acidic mixture was refluxed 12 hours, cooled and extracted with benzene. The aqueous layer was made basic with 50% sodium hydroxide solution and the oil which separated was extracted with benzene. The benzene extracts were dried over magnesium sulfate and evaporated. The crude oil was converted to the hydrochloride salt which was recrystallized from isopropanol and melted at 181–183° C.

*Analysis.*—Calcd. for $C_{14}H_{20}ClNO_3$ (percent): C, 58.84; H, 7.05; N, 4.90. Found (percent): C, 58.99; H, 7.05; N, 4.97.

PREPARATION 4

1-benzyl-4-(p-bromophenoxy)piperidine hydrochloride

To a stirred solution of 1.4 g. (0.06 mole) of sodium hydride in 75 ml. of dimethylformamide at 60–70° C. was added slowly a solution of 7.2 g. (0.038 mole) of 1-benzyl-4-piperidinol in 25 ml. of dimethylformamide. After the addition was complete, heating and stirring were continued until the evolution of gas ceased. A solution of 9.0 g. (0.051 mole) of p-bromofluorobenzene in 25 ml. of dimethylformamide was then added and heating at 65–70° C. with stirring was continued for 16 hours. The mixture was cooled, treated with 200 ml. of water and extracted with benzene. The combined extracts were washed with water, dried and the solvent evaporated. The residual oil was converted to the hydrochloride salt which was recrystallized from an ethanol-ether mixture yielding 9.3 g. (64%) of white product melting at 215–217° C.

*Analysis.*—Calcd. for $C_{18}H_{21}BrClNO$ (percent): C, 56.48; H, 5.53; N, 3.66. Found (percent): C, 56.59; H, 5.43; N, 3.60.

PREPARATION 5

1-benzyl-4-(p-trifluoromethylphenoxy)piperidine hydrochloride

To a stirred suspension of 6.7 g. (0.28 mole) of sodium hydride in 300 ml. of dimethylformamide at 60–70° C. was added slowly a solution of 40 g. (0.21 mole) of 1-benzyl-4-piperidinol in 75 ml. of dimethylformamide. After the addition was complete, heating was continued until the evolution of gas ceased. A solution of 39.5 g. (0.24 mole) of p-fluorobenzotrifluoride in 50 ml. of dimethylformamide was added slowly. The reaction was slightly exothermic and external heating was removed for a short period of time. The reaction temperature was then maintained at 60–70° C. by the rate of addition. After the addition was completed, stirring and heating at 70–75° C. were continued for 16 hours, although thin layer chromatography indicated the reaction was essentially complete about 30 minutes after the final portion of reactant had been added. The mixture was treated with one liter of water and extracted with benzene. The combined extracts were washed with water, dried, and the solvent evaporated at reduced pressure. The residual oil was taken up in isopropanol and treated with ethereal hydrogen chloride, yielding 73 g. (94%) of white product melting at 255–257° C.

*Analysis.*—Calcd. for $C_{19}H_{21}ClF_3NO$ (percent): C, 61.38; H, 5.69; N, 3.77. Found (percent): C, 61.52; H, 5.66; N, 3.75.

PREPARATION 6

4-(p-trifluoromethylphenoxy)piperidine

A solution of 46.0 g. of 1-benzyl-4-(p-trifluoromethylphenoxy)piperidine in 250 ml. of 95% ethanol was treated with approximately 6 g. of palladium-on-charcoal catalyst and was shaken with hydrogen at 60° C. until one equivalent of hydrogen was absorbed. The suspension was cooled, filtered and the solvent evaporated. The residual oil was distilled at reduced pressure and the fraction boiling at 74–76° C./0.05 mm. collected. The water-white oil which crystallized on standing weighed 26.0 g. (78% yield) and melted at 43–47° C.

*Analysis.*—Calcd. for $C_{12}H_{14}F_3NO$ (percent): C, 58.77; H, 5.75; N, 5.71. Found (percent): C, 58.83; H, 5.71; N, 5.73.

PREPARATION 7

1-benzyl-4-phenoxypiperidine hydrochloride

To a stirred suspension of 1.4 g. (0.06 mole) of sodium hydride in 75 ml. of dimethylformamide at 60–70° C. was added slowly a solution of 7.7 g. (0.04 mole) of 1-benzyl-4-piperidinol in 25 ml. of dimethylformamide. After the addition was complete, stirring and heating were continued until the evolution of gas ceased. A solution of 7.7 g. (0.08 mole) of fluorobenzene in 25 ml. of dimethylformamide was then added and heating (65–70° C.) and stirring were continued for 16 hours. Thin layer chromatography indicated the reaction was about 50% completed. The temperature of the reaction mixture was then increased to 90–95° C. and stirring was continued for four more hours. The mixture was cooled, treated with 400 ml. of water and extracted with benzene. The combined extracts were washed with water, dried, and the solvent evaporated. The residual oil was distilled at reduced pressure and the fraction boiling at 135–138° C./0.05 mm. collected. The water-white oil weighed 3.3 g. (31% yield). A portion (2.5 g.) of the free base was converted to the hydrochloride salt which was recrystallized from an isopropanol-isopropyl ether mixture yielding 2.3 g. of white product melting at 207–209° C.

*Analysis.*—Calcd. for $C_{18}H_{22}ClNO$ (percent): C, 71.15; H, 7.30; N, 4.61. Found (percent): C, 71.07; H, 7.33; N, 4.36.

The examples immediately following illustrate the preparation of 1-substituted-4-phenoxypiperidines according to the invention.

EXAMPLE 1

1-ethoxycarbonyl-4-(3-trifluoromethylphenoxy)piperidine

To a stirred solution of 9.8 g. (0.04 mole) of 4-(3-trifluoromethylphenoxy)piperidine, 6.2 g. (0.045 mole) of potassium carbonate and 80 ml. of methylene chloride at 0° C. was added slowly a solution of 5.0 g. (0.046 mole) of ethyl chlorocarbonate in 20 ml. of methylene chloride. Ice was added to the reaction mixture and stirring was continued until the mixture reached room temperature. The organic layer was separated, washed with dilute hydrochloric acid and water, dried over magnesium sulfate, and the solvent was evaporated at reduced pressure. The residual oil was distilled at reduced pressure and the fraction boiling at 107–111° C./0.04 mm. was collected. It weighed 9.6 g. (76% yield).

*Analysis.*—Calcd. for $C_{15}H_{18}F_3NO_3$ (percent): C, 56.78; H, 5.72; N, 4.41. Found (percent): C, 56.93; H, 5.73; N, 4.57.

EXAMPLE 2

1-[2-(2-methoxyphenoxy)ethyl]-4-(2-methoxyphenoxy)piperidine

A stirred mixture of 3.7 g. (0.018 mole) of 4-(2-methoxyphenoxy)piperidine, 4.5 g. (0.019 mole) of 2-(2-methoxyphenoxy)ethyl bromide, 20 g. of potassium carbonate and 150 ml. of toluene was refluxed 18 hours. The cooled reaction mixture was filtered and the toluene evaporated. The residual oil was acid-base extracted using benzene. The combined benzene extracts were dried over magnesium sulfate and the solvent evaporated at reduced pressure. The residual oil crystallized on standing and weighed 5.2 g. (81% yield). The product melted at 85–86° C. after crystallization from isopropanol.

*Analysis.*—Calcd. for $C_{21}H_{27}NO_4$ (percent): C, 70.56; H, 7.62; N, 3.92. Found (percent): C, 70.82; H, 7.69; N, 3.90.

Using the procedure of Example 2, the following compounds are prepared.

1-[3-(4-methoxyphenoxy)propyl] - 4 - (3,5 - dimethylphenoxy)piperidine is prepared from 4-(3,5-dimethylphenoxy)piperidine and 3-(4-methoxyphenoxy)propyl bromide;

1-[4-(4-chlorophenoxy)butyl]-4-(4 - methoxyphenoxy)piperidine is prepared from 4-(4-methoxyphenoxy)piperidine and 4-(4-chlorophenoxy)butyl bromide.

EXAMPLE 3

1-(2,3-dihydroxypropyl)-4-(3-trifluoromethylphenoxy)piperidine

A stirred mixture of 4.0 g. (0.16 mole) of 4-(3-trifluoromethylphenoxy)piperidine, 1.8 g. (0.016 mole) of 3-chloro-1,2-propanediol, 10 g. of potassium carbonate and 60 ml. of 1-butanol was refluxed 16 hours, cooled, filtered and the solvent evaporated. The residual oil was dissolved in benzene, the benzene solution washed with water, dried over magnesium sulfate and the benzene evaporated. The free base was converted to the hydrochloride salt which weighed 3.1 g. (55% yield) and melted at 129–130.5° C. after crystallization from an isopropanol-isopropyl ether mixture.

*Analysis.*—Calcd. for $C_{15}H_{21}NO_3F_3Cl$ (percent): C, 50.63; H, 5.95; N, 3.94. Found (percent): C, 50.62; H, 5.96; N, 3.82.

Using the procedure of Examples 2 and 3, the following compounds are prepared using the stated materials.

1-(2-phenethyl) - 4 - (3,5-diethylphenoxy)piperidine is prepared from 4-(3,5-diethylphenoxy)piperidine and 2-phenethyl bromide;

1-(3-cyclohexylpropyl) - 4 - (4-methoxyphenoxy)piperidine is prepared from 4-(4-methoxyphenoxy)piperidine and 3-cyclohexyl propyl bromide;

1-(3-hydroxypropyl)-4-(4-chlorophenoxy)piperidine is prepared from 4-(4-chlorophenoxy)piperidine and 3-hydroxypropyl bromide.

EXAMPLE 4

1-[3-(4-fluorobenzoyl)propyl]-4-(2-methoxyphenoxy)piperidine hydrochloride

A mixture of 4.1 g. (0.020 mole) of 4-(2-methoxyphenoxy)piperidine, 5.4 g. (0.020 mole) of 2-(4-fluorophenyl)-2-(3-chloropropyl)-1,3-dioxolane, 20 g. of potassium carbonate and 120 ml. of 1-butanol was refluxed 48 hours, cooled, filtered and the solvent evaporated at reduced pressure. The free ketone was regenerated by acid hydrolysis. The acidic solution was basified with 50% sodium hydroxide solution and extracted with benzene. The combined benzene extracts were dried over magnesium sulfate, the solvent evaporated at reduced pressure, and the crude product converted to the hydrochloride salt which was recrystallized from isopropanol, weighed 3.5 g. (44% yield) and melted at 217–218° C.

*Analysis.*—Calcd. for $C_{22}H_{27}NO_3ClF$ (percent): C, 64.78; H, 6.67; N, 3.43. Found (percent): C, 64.91; H, 6.73; N, 3.57.

EXAMPLE 5

4-(4-acetyl-2-methoxyphenoxy)-1-[3-(4-fluorobenzoyl)propyl]piperidine hydrochloride A mixture of 3.0 g. (0.010 mole) of 4-(4-acetyl-2-methoxyphenoxy)piperidine hydrochloride, 2.9 g. (0.012 mole) of 2-(4-fluorophenyl)-2-(3 - chloropropyl)-1,3-dioxolane, 20 g. of potassium carbonate and 100 ml. of 1-butanol was refluxed 40 hours, cooled, filtered and the solvent evaporated at reduced pressure. The residual oil was stirred for one hour with 75 ml. of ethanol and 100 ml. of 3 N hydrochloric acid, the acid solution was made basic with 50% sodium hydroxide solution, and the oil which separated was extracted with benzene. The combined benzene extracts were washed with water, dried over magnesium sulfate and the solvent evaporated at reduced pressure. The oil was converted to the hydrochloride salt which was recrystallized from isopropanol to give 2.0 g. (44% yield) of the hydrochloride salt which melted at 175–177° C.

*Analysis.*—Calcd. for $C_{24}H_{29}ClFNO_4$ (percent): C, 64.07; H, 6.50; N, 3.11. Found (percent): C, 64.06; H, 6.47; N, 3.25.

EXAMPLE 6

4-(4-acetyl-2-methoxyphenoxy)-1-[3-(4-fluorophenoxy)propyl]piperidine oxalate

A mixture of 3.0 g. (0.010 mole) of 4-(4-acetyl-2-methoxyphenoxy)piperidine hydrochloride, 2.8 g. (0.012 mole) of 3-(4-fluorophenoxy)propylbromide, 20 g. of potassium carbonate and 100 ml. of 1-butanol was refluxed 40 hours, cooled, filtered and the solvent evaporated at reduced pressure. The residual oil was dissolved in benzene and washed with water. The benzene solution was dried over magnesium sulfate and the benzene evaporated yielding 4.0 g. of crude product. The free base was converted to the oxalate salt which was recrystallized from an isopropanol-isopropyl ether mixture and melted at 118–120° C.

*Analysis.*—Calcd. for $C_{25}H_{30}FNO_8$ (percent): C, 61.09; H, 6.15; N, 2.85. Found (percent): C, 61.04; H, 6.14; N, 2.98.

EXAMPLE 7

1-[3-(4-acetyl-2-methoxyphenoxy)propyl]-4-phenoxypiperidine oxalate hemihydrate

A stirred mixture of 4.0 g. (0.022 mole) of 4-phenoxypiperidine, 6.9 g. (0.024 mole) of 3-(4-acetyl-2-methoxyphenoxy)propylbromide, 14 g. of potassium carbonate and 60 ml. of 1-butanol was refluxed 16 hours, cooled, filtered and the solvent evaporated at reduced pressure. The residual oil was dissolved in benzene, washed with water, the benzene layer was dried over magnesium sulfate and the benzene evaporated. The free base was converted to the oxalate salt which was recrystallized from isopropanol to give 3.6 gm. (35% yield) of product which melted at 126–130° C.

*Analysis.*—Calcd. for $C_{50}H_{64}N_2O_{17}$ (percent): C, 62.23; H, 6.69; N, 2.90. Found (percent): C, 62.43; H, 6.88; N, 3.04.

EXAMPLE 8

1-[3-(4-acetyl-2-methoxyphenoxy)propyl]-4-(2-methoxyphenoxy)piperidine hydrochloride A mixture of 4.1 g. (0.02 mole) of 4-(2-methoxyphenoxy)piperidine, 5.7 g. (0.02 mole) of 3-(4-acetyl-2-methoxyphenoxy)propylbromide, 12 g. of potassium carbonate and 75 ml. of toluene was refluxed 16 hours, cooled and treated with 100 ml. of water, The organic layer was separated, washed with water and the solvent evaporated. The free base was converted to the hydrochloride salt and recrystallized from isopropanol to give 3.2 g. (35% yield) of product which melted at 128–131° C.

*Analysis.*—Calcd. for $C_{24}H_{32}ClNO_5$ (percent): C, 64.05; H, 7.17; N, 3.11. Found (percent): C, 63.66; H, 7.48; N, 3.11.

FORMULATION AND ADMINISTRATION

Effective quantities of any of the foregoing pharmacologically active 1-substituted-4-aryloxypiperidines may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their pharmaceutically acceptable non-toxic acid addition salts for purposes of convenience of crystallization, increased solubility, and the like.

Although very small quantities of the active materials of the present invention, even as low as one miligram, are effective when minor therapy is involved or in the cases of administration to subjects having a relatively low body weight, unit dosages are usually five milligrams or above and preferably twenty-five, fifty or one hundred milligrams. Five to fifty milligrams appear optimum per unit dose, while usual broader ranges appear to be one to 300 milligrams per unit dose. The active agents of the invention may be combined with other pharmacologically active agents, or with buffers, antacids or the like, for administration and the proportion of the active agent in the composition may be varied widely. It is only necessary that the active ingredient constitute an effective amount; i.e., such that a suitable effective dosage will be obtained consistent with the dosage form employed. Obviously, several unit dosage forms may be administered at about the same time.

Examples of compositions within the preferred ranges are given as follows:

Capsules.—Capsules of 5 mg., 25 mg., and 50 mg. of active ingredient per capsule are prepared, with the higher amounts of ingredient, reduction may be made in the amount of lactose.

| Typical blend for encapsulation: | Per capsule, mg. |
|---|---|
| Active ingredient | 5.0 |
| Lactose | 296.7 |
| Starch | 129.0 |
| Magnesium stearate | 4.3 |
| | 435.0 |

Uniformly blend the selected active ingredient with lactose, starch and magnesium stearate and encapsulate the blend.

Tablets.—A typical formulation for a tablet containing 5.0 mg. of active ingredient per tablet follows. The formulation may be used for other strengths of active ingredient by adjustment of weight of dicalcium phosphate.

| Ingredients: | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| | 170.1 |

Uniformly blend 1, 2, 4, and 5. Prepare 3 as a 10 percent paste in water. Granulate the blend with the starch paste and pass the wet mass through a number eight mesh screen. The wet granulation is dried and passed through a number twelve mesh screen. The dried granules are blended with calcium stearate and compressed.

Intramuscular injection:

| Ingredients: | Per ml. |
|---|---|
| (1) Active ingredient, as salt | 10.0 mg. |
| (2) Isotonic buffer sodium 4.0 | q.s. to 2.0 ml. |

Dissolve the active ingredient in the buffer solution and aseptically filter the solution. Fill sterile ampoules with the filtered solution and seal under aseptic conditions.

Various modifications and equivalents will be apparent to one skilled in the art and may be made in the compounds, methods, compositions, and procedures of the present invention without departing from the spirit or scope thereof, and it is therefore to be understood that the invention is to be limited only by the scope of the appended claims.

What is claimed is:
1. A compound selected from
(a) 4-phenoxypiperidine having the formula:

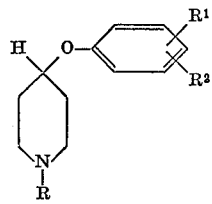

wherein:
R is selected from the group consisting of lower-alkoxyphenoxylower-alkyl, fluorophenyllower-alkyl, 2-methoxy-4-acetylphenoxylower-alkyl, fluorobenzoyllower-alkyl, ethoxycarbonyl and 2,3-dihydroxypropyl,
$R^1$ is selected from the group consisting of hydrogen, lower-alkyl, lower-alkoxy, trifluoromethyl and halogen of atomic weight less than 80,
$R^2$ is selected from the group consisting of hydrogen and acetyl, and
(b) pharmaceutically acceptable acid addition salts thereof.

2. A compound as defined in claim 1 which is 1-[3-(4-fluorobenzoyl)propyl]-4-(2-methoxyphenoxy)piperidine.

3. A compound as defined in claim 1 which is 4-(4-acetyl-2-methoxyphenoxy)-1-[3-(4-fluorobenzoyl)propyl]piperidine.

4. A compound as defined in claim 1 which is 4-(4-acetyl-2-methoxyphenoxy)-1-[3-(4-fluorophenoxy)propyl]piperidine.

5. A compound as defined in claim 1 which is 1-ethoxycarbonyl-4-(3-trifluoromethylphenoxy)piperidine.

6. A compound as defined in claim 1 which is 1-[2-(2-methoxyphenoxy)ethyl]-4-(2-methoxyphenoxy)piperidine.

7. A compound as defined in claim 1 which is 1-(2,3-dihydroxypropyl)-4-(3-trifluoromethylphenoxy)piperidine.

8. A compound as defined in claim 1 which is 1-[3-(4-acetyl-2-methoxyphenoxy)propyl]-4-phenoxypiperidine.

9. A compound as defined in claim 1 which is 1-[3-(4-acetyl-2-methoxyphenoxy)propyl]-4-(2-methoxyphenoxy)piperidine.

References Cited
UNITED STATES PATENTS 3,260,723  7/1966  l'Italien et al. _____ 260—294.7
3,381,013  4/1968  Minor _____ 260—294.7

JOHN D. RANDOLPH, Primary Examiner
G. T. TODD, Assistant Examiner

U.S. Cl. X.R.
260—293.73, 293.8, 293.83, 293.84, 293.85; 424—267